April 26, 1949.	H. KLEMPERER	2,468,080
VOLTAGE REGULATION

Filed Jan. 31, 1947	2 Sheets-Sheet 1

INVENTOR
HANS KLEMPERER
BY
ATTORNEY

INVENTOR
HANS KLEMPERER
BY Elmer J. Gorn
ATTORNEY

Patented Apr. 26, 1949

2,468,080

UNITED STATES PATENT OFFICE 2,468,080

VOLTAGE REGULATION

Hans Klemperer, Belmont, Mass., assignor to Raytheon Manufacturing Company, Newton, Mass., a corporation of Delaware Application January 31, 1947, Serial No. 725,681

5 Claims. (Cl. 320—1)

This invention relates to voltage regulation and more particularly to a system for regulating the voltage to which a storage condenser is charged.

In charging storage condensers from an alternating current source it has heretofore been found desirable to control the charging of the condenser by means of a control potential derived from the charge on the condenser. It has also been the practice to superimpose upon this control potential an alternating potential of the same frequency as the alternating current source, which alternating potential is shifted in phase relative to the source. The introduction of the phase-shifted alternating potential into the control system has heretofore resulted in variations in the control potential proportional to variations in the voltage of the source.

It is among the objects of the present invention to provide a voltage-regulating system responsive to the potential across the load, and also responsive to a phase-shifted alternating potential derived from the source and in which variations in voltage of the source are not reflected in the control potential.

It is a further object of the invention to provide a condenser charging system in which the condenser may be charged to and maintained at a desired potential regardless of variations in the potential of the source.

Figure 1:
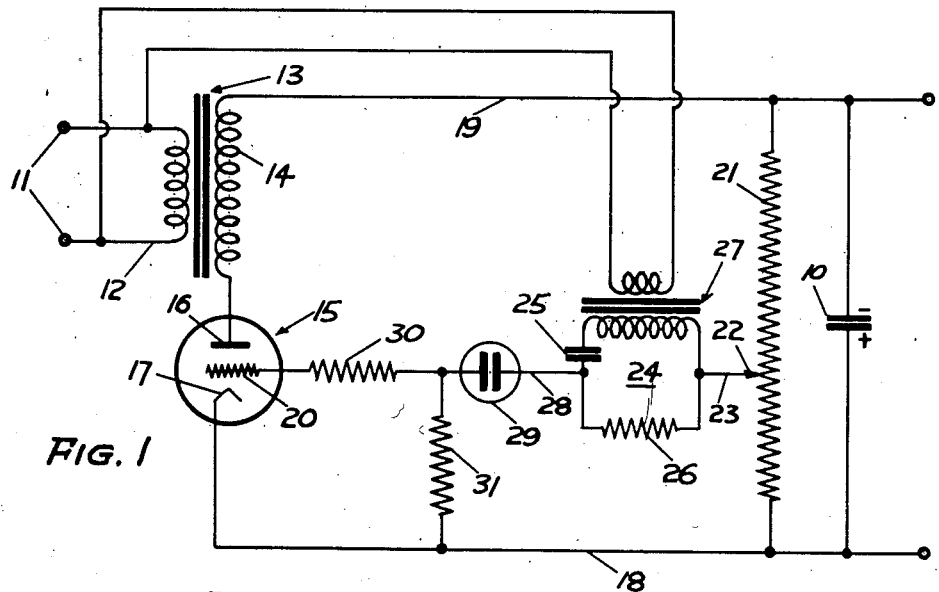
Figure 2:
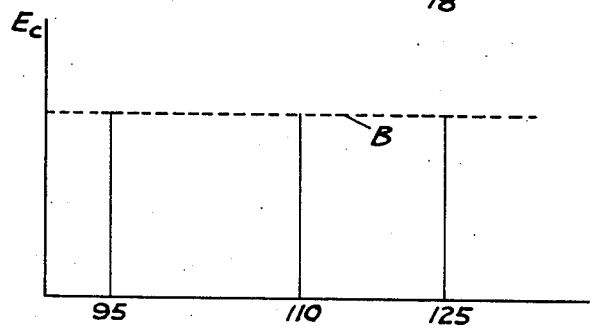
Figure 3:
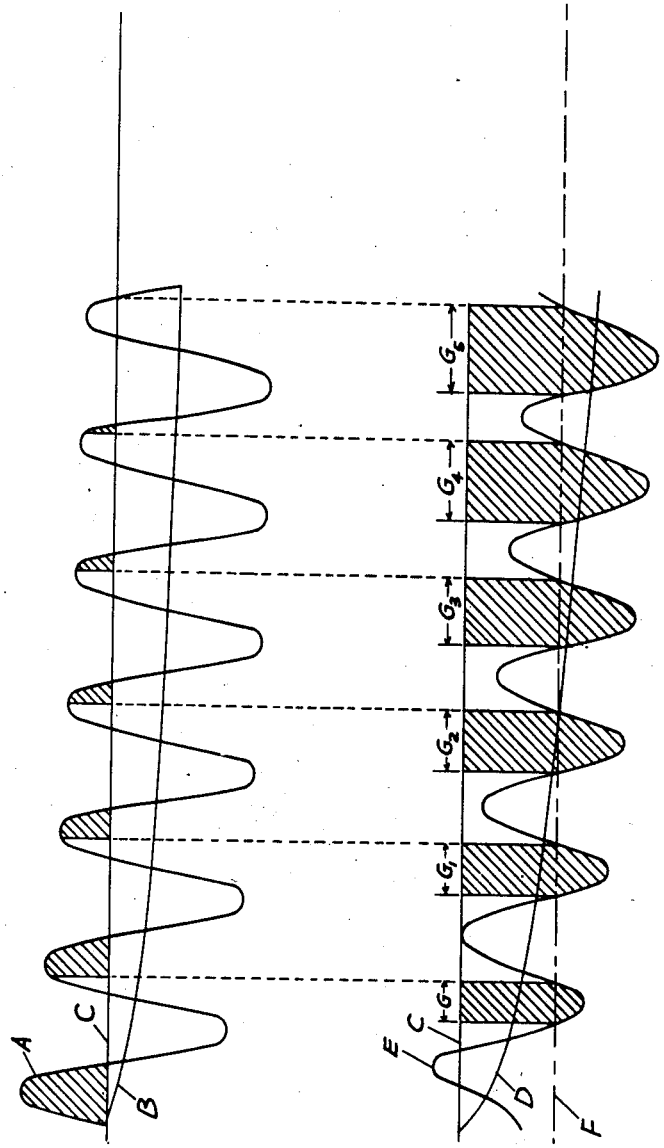

The above and other objects and features of the invention will be made fully apparent to those skilled in the art from a consideration of the following detailed description taken in conjunction with the accompanying drawings in which:

Fig. 1 shows a schematic diagram of an electrical system for regulating the charge on a condenser; and Figs. 2 and 3 show sets of curves useful in explaining the operation of the invention.

Referring to the drawings, reference numeral 10 indicates a condenser adapted to be charged from a suitable source of alternating current, the terminals 11 of which source are connected across the primary winding 12 of a transformer 13 having a secondary winding 14. The secondary winding 14 is connected across the condenser 10 through an electrical space discharge device 15. The discharge device 15 may be a thyratron or similar gaseous discharge device having an anode 16 connected to one end of the secondary winding 14 and having a cathode 17 connected through a conductor 18 to the positive side of the condenser 10. The opposite side of the condenser 10 is connected through a conductor 19 to the other terminal of the secondary winding 14. The discharge device 15 is also provided with a control electrode or grid 20. In order to energize the control electrode 20 a potential is derived from the condenser 10 by means of a resistor 21 connected across the condenser and having an adjustable tap 22 connected to some point intermediate the length of said resistor. The tap 22 is connected by a conductor 23 to one side of a phase-shifting circuit 24. The phase-shifting circuit 24 comprises a condenser 25 and an impedance 26 connected in series. An alternating frequency corresponding to or derived from the source 11 is imposed on the phase-shifting circuit 24 through a transformer 27. The phase-shifting circuit 24 is connected through a conductor 28 to one side of a glow tube 29. The opposite side of the glow tube 29 is connected through a grid resistor 30 to the control grid 20 and also is connected through a resistor or other impedance 31 to the cathode conductor 18.

In the operation of the system, when the charge on the condenser 10 is low, the potential drop available between the tap 22 and the cathode conductor 18 will be small and insufficient to overcome the breakdown voltage of the glow tube 29 even at a time when the peak of the phase-shifted voltage from the phase shifter 24 is applied across this tube. Under these conditions the voltage on the grid 20 is the same as the voltage upon the cathode 17 and the tube 15 may conduct through substantially the full half wave of positive potential applied from the source. Under this condition the condenser is rapidly charged to a voltage which may be predetermined by the setting of the tap 22. As the predetermined voltage is approached, the voltage applied at the tap 22 becomes such that when the peak potential of the phase-shifted voltage is superimposed on said predetermined voltage, the combined voltage is sufficient to fire the tube 29. As the tube 29 fires, the combined potential is applied to the cathode-grid circuit across the impedance 31. The grid 20 receives a negative bias during the early portion of the positive half wave of potential across the cathode-anode circuit of the discharge device and accordingly this device does not conduct until the latter portion of this positive half wave. A smaller increment of charge is supplied to the condenser 10, and as the charge on the condenser 10 increases, the increments become smaller and smaller until the charge on the condenser reaches the desired value, at which time the bias applied to the grid 20 is sufficient to maintain the tube 15 blocked during the entire half wave of positive potential across the discharge tube.

Where it is required that the condenser remain in the charged state for a short interval prior to the discharge thereof through the load circuit, the leakage current may substantially reduce the potential. Under this condition the reduced potential across the condenser 10 permits the discharge tube 15 to be conductive during a small portion of the positive half-wave to supply a trickle charge to the condenser thus maintaining the voltage at the desired value. Variations in the peak potential of the alternating source will effect only small changes in the control potential as applied to the grid 20.

It is important that the phase-shifting circuit 24 be disposed in series with the glow tube 29 in the circuit including said phase-shifting circuit, said glow tube, the impedance 31 and the portion of the resistor 21 between the tap 22 and conductor 18. If the phase-shifting circuit is disposed in the cathode-grid circuit, as for example at some point in the circuit between the resistor 30 and the impedance 31, then variations in the voltage of the source will result in relatively large variations in the control potential applied to the grid 20, and hence the potential to which the condenser 10 is charged will vary over a range proportionate to variations in the source. In the system of the present invention, variations in the potential of the source do not affect the control potential. As shown in Fig. 2 where the ordinates Ec represent the charge on the condenser 10 and the abscissa represents the voltage of the power supply line, it will be seen that where the line voltage varies from 95 to 125 volts, the voltage across the condenser does not vary substantially with variations in the line voltage but remains substantially constant as indicated by the dotted line B.

The explanation for this will be apparent from a consideration of the set of curves shown in Fig. 3. It will be understood that these curves are intended to represent in a qualitative manner the operation of the system, and are not intended to represent the operation in a quantitative sense. Referring to the upper set of curves of this figure, the curve A represents the alternating potential applied from the secondary winding 14 of the transformer 13 to the anode 16 of the thyratron 15. This alternating potential is superimposed upon a potential indicated by the curve B which represents the increasingly negative potential upon the line 19 with reference to the cathode potential indicated by the line C. It will be seen from this upper set of curves that as the potential on the line 19 becomes more negative with respect to the cathode 17 as the condenser 10 becomes charged, the effective peaks of potential applied from the alternating current source through the transformer 13 on the anode 16 become lower and lower. In the lower set of curves of this figure the curve D represents the increasingly negative potential applied to the tap 22 as this point becomes more negative with reference to the cathode potential during the charging of the condenser 10. The cathode potential is again indicated by the line C. The curve E represents the alternating potential that is superimposed upon the curve D by the phase-shifting circuit 24. The line F represents the ignition potential of the glow tube 29. When the combined value of the potential D and its superimposed alternating potential E differs from the cathode potential C by the distance between C and F, the glow tube 29 will be fired. The firing period of the glow tube 29 is represented by the gradually increasing shaded areas G, $G_1$, $G_2$, etc. When the tube 29 is conductive, the grid 20 of the tube 15 is sufficiently negative so that the tube 15 is blocked. However, when the tube 29 is extinguished, the voltage on the grid 20 returns to the cathode voltage and the tube 15 is fired. The firing of the tube 15 thus corresponds with the trailing edge of each of the areas G, $G_1$, $G_2$, etc. Projecting this trailing edge of the areas G, $G_1$, $G_2$, etc. upon the upper set of curves, it will be seen that the firing of the tube 15 will occur later and later during the positive peaks of potential upon the anode 16. That portion of the positive peaks during which the tube 15 is conductive is indicated by the shaded portion of the positive peaks of potential above the line C. Conduction through the tube 15 becomes less and less until the trailing edge of some conductive period of the tube 29, such as the period $G_5$, coincides with the end of the positive peak of potential upon the anode 16, that is coincides with the point at which the curve A falls below the line C. When this happens, the tube 15 is no longer conductive during any portion of the positive half wave of potential applied from the alternating current source 11. It will be seen that if the peak value of the phase-shifted voltage applied from the circuit 24, and indicated by the curve E, increases or decreases, such variations in the value of the phase-shifted potential will have substantially no effect upon the ignition of the tube 15. Increases in the peak values of E, within practical limits, will have substantially no effect upon the termination of the period $G_4$ or $G_5$ corresponding to the extinction of the glow tube 29 toward the end of the charging period of the condenser 10, and any substantial decrease in the peak values sufficient to prolong the duration of the period $G_5$ would only cause the conduction of the tube 29 to be prolonged to a time well after the termination of the positive half wave on the tube 15, and the tube could not conduct in any event.

While there has been herein described a preferred embodiment of the invention, other embodiments within the scope of the appended claims will be apparent to those skilled in the art. For example, the invention has been disclosed in conjunction with a half-wave charging system. The invention can be used in conjunction with a full-wave rectifier and the load need not necessarily be a condenser but might be any other device to which a predetermined constant voltage is to be supplied.

What is claimed is:

1. An electrical system comprising an alternating current source, a load, a rectifier connecting said load to said source, a constant voltage drop device and an impedance arranged in series, means to derive a unidirectional voltage proportional to the voltage across the load, means to superimpose a phase-shifted alternating voltage derived from said source upon said unidirectional voltage to obtain a combined voltage, means to impress said combined voltage on said constant voltage device and said impedance, and means responsive to the potential drop across said impedance for controlling said rectifier to disconnect said load from said source when said potential drop reaches a predetermined value.

2. An electrical system comprising an alternating current source, a condenser, a circuit for charging said condenser from said source, a controlled electrical space discharge device in said circuit between said source and said condenser, said electrical space discharge device having a control element for controlling the flow of current through said circuit, means for deriving an alternating potential of the same frequency as said source and shifted in phase relative thereto, means for deriving a voltage proportionate to the voltage on said condenser, means for superimposing said two derived voltages to obtain a control voltage, and circuit means including a constant voltage drop device for impressing said control voltage on said control element.

3. An electrical system comprising an alternating current source, a condenser, a circuit for charging said condenser from said source, a controlled electrical space discharge device in said circuit between said source and said condenser, said electrical space discharge device having a control element for controlling the flow of current through said circuit, a phase-shifting device energized from said source, means to impress a voltage proportionate to the voltage on said condenser across said phase-shifting device to derive a combined voltage, and circuit means including a glow tube for imposing said combined voltage upon said control element.

4. An electrical system comprising an alternating current source, a condenser, a circuit for charging said condenser from said source, a controlled electrical space discharge device in said circuit between said source and said condenser, said electrical space discharge device having a control element for controlling the flow of current through said circuit and having a cathode, a phase-shifting device energized from said source, means to impress a voltage proportionate to the voltage on said condenser across said phase-shifting device, a circuit including an impedance connecting said cathode and said control element, a circuit connecting said phase-shifting device across said impedance, a glow tube between said phase-shifting device and said impedance, and circuit means connecting said control element to a point between said glow tube and said impedance.

5. An electrical system comprising an alternating current source, a condenser, a circuit for charging said condenser from said source, a controlled electrical space discharge device in said circuit between said source and said condenser, said electrical space discharge device having a control element for controlling the flow of current through said circuit, a phase-shifting circuit for imposing a phase-shifted alternating potential derived from said source upon said control element, means to impress a voltage proportionate to the voltage on said condenser across said phase-shifting circuit, a glow tube and an impedance arranged in series with said phase-shifting circuit, and circuit means connecting said control element to a point between said glow tube and said impedance.

HANS KLEMPERER.

REFERENCES CITED

The following references are of record in the file of this patent:

UNITED STATES PATENTS

| Number | Name | Date |
| --- | --- | --- |
| 2,250,102 | Klemperer | July 22, 1941 |
| 2,383,492 | Klemperer | Aug. 28, 1945 |